(12) United States Patent
Kim et al.

(10) Patent No.: US 11,026,298 B2
(45) Date of Patent: Jun. 1, 2021

(54) INK COMPOSITION, CURED PATTERNS PRODUCED THEREBY, HEATING ELEMENT INCLUDING SAME, AND MANUFACTURING METHOD THEREFOR

(71) Applicant: LG CHEM, LTD., Seoul (KR)

(72) Inventors: Jooyeon Kim, Daejeon (KR); Yong Goo Son, Daejeon (KR); Seung Heon Lee, Daejeon (KR); Jiehyun Seong, Daejeon (KR); Ji Eun Myung, Daejeon (KR); Kiseok Lee, Daejeon (KR)

(73) Assignee: LG Chem, Ltd., Seoul (KR)

( * ) Notice: Subject to any disclaimer, the term of this patent is extended or adjusted under 35 U.S.C. 154(b) by 239 days.

(21) Appl. No.: 16/084,523

(22) PCT Filed: Dec. 23, 2016

(86) PCT No.: PCT/KR2016/015175
§ 371 (c)(1),
(2) Date: Sep. 12, 2018

(87) PCT Pub. No.: WO2017/171205
PCT Pub. Date: Oct. 5, 2017

(65) Prior Publication Data
US 2019/0098706 A1    Mar. 28, 2019

(30) Foreign Application Priority Data

Apr. 1, 2016 (KR) ................ 10-2016-0040409

(51) Int. Cl.
| | |
|---|---|
| *C09D 11/102* | (2014.01) |
| *C09D 11/037* | (2014.01) |
| *C09D 11/033* | (2014.01) |
| *H05B 3/84* | (2006.01) |
| *H05B 3/86* | (2006.01) |

(52) U.S. Cl.
CPC ............. *H05B 3/86* (2013.01); *C09D 11/033* (2013.01); *C09D 11/037* (2013.01); *C09D 11/102* (2013.01); *H05B 3/84* (2013.01); *H05B 2203/007* (2013.01); *H05B 2203/013* (2013.01);
(Continued)

(58) Field of Classification Search
None
See application file for complete search history.

(56) References Cited

U.S. PATENT DOCUMENTS

| | | | |
|---|---|---|---|
| 8,785,524 | B2 | 7/2014 | Wu et al. |
| 10,755,927 | B2 * | 8/2020 | Su .................. H01L 21/0276 |

(Continued)

FOREIGN PATENT DOCUMENTS

| | | |
|---|---|---|
| CN | 1385757 A | 12/2002 |
| CN | 1453317 A | 11/2003 |

(Continued)

OTHER PUBLICATIONS

JP 2014-169400 A, Chisaka et al, Sep. 2014, partial translation.*
(Continued)

*Primary Examiner* — Joseph M. Pelham
(74) *Attorney, Agent, or Firm* — Dentons US LLP

(57) ABSTRACT

The present specification relates to an ink composition, a cured pattern prepared using an ink composition, a heating element including a cured pattern, and a method for manufacturing a heating element.

16 Claims, 2 Drawing Sheets

(1)

(2)

(3)

(52) U.S. Cl.
CPC .... *H05B 2203/017* (2013.01); *H05B 2214/02* (2013.01)

(56) References Cited

U.S. PATENT DOCUMENTS

| | | | | |
|---|---|---|---|---|
| 2002/0136968 | A1* | 9/2002 | Takebe | G03F 7/033 430/7 |
| 2003/0008237 | A1 | 1/2003 | Pavelchek et al. | |
| 2003/0231234 | A1* | 12/2003 | Ushirogouchi | C09D 11/38 347/100 |
| 2004/0067434 | A1* | 4/2004 | Kano | G03F 7/027 430/270.1 |
| 2004/0102543 | A1* | 5/2004 | Sasa | C09D 11/101 523/160 |
| 2006/0105111 | A1* | 5/2006 | Watanabe | B41M 7/0081 427/421.1 |
| 2007/0196629 | A1* | 8/2007 | Smith | B32B 17/10761 428/195.1 |
| 2007/0196630 | A1* | 8/2007 | Hayes | B32B 17/10036 428/195.1 |
| 2007/0238804 | A1* | 10/2007 | Ho | A61K 6/20 522/77 |
| 2007/0249484 | A1* | 10/2007 | Benkhoff | B01J 31/0205 502/5 |
| 2007/0254240 | A1* | 11/2007 | Sasaki | G03F 7/105 430/270.1 |
| 2008/0066296 | A1 | 3/2008 | Shin et al. | |
| 2009/0241365 | A1* | 10/2009 | Taguchi | F26B 21/004 34/389 |
| 2010/0110523 | A1* | 5/2010 | Varaprasad | G02F 1/1525 359/273 |
| 2011/0102528 | A1 | 5/2011 | Tsuchimura et al. | |
| 2011/0318882 | A1 | 12/2011 | Wu et al. | |
| 2012/0099214 | A1* | 4/2012 | Lee | G02B 5/223 359/885 |
| 2012/0149798 | A1* | 6/2012 | Saito | C08K 5/0025 522/54 |
| 2012/0301696 | A1* | 11/2012 | Watanabe | C08K 5/3477 428/220 |
| 2013/0274433 | A1* | 10/2013 | Endo | C07D 303/16 528/296 |
| 2014/0273457 | A1* | 9/2014 | Su | C08F 220/18 438/692 |
| 2015/0044509 | A1 | 2/2015 | Kunimoto et al. | |
| 2015/0049291 | A1* | 2/2015 | Hatanaka | G02B 5/305 349/194 |
| 2015/0218394 | A1 | 8/2015 | Kim et al. | |
| 2015/0373844 | A1 | 12/2015 | Yoon et al. | |
| 2016/0278166 | A1 | 9/2016 | Seong et al. | |
| 2017/0154866 | A1* | 6/2017 | Fathi | B32B 9/025 |
| 2019/0080820 | A1* | 3/2019 | Myung | H01B 5/14 |
| 2019/0341364 | A1* | 11/2019 | Fathi | B32B 7/06 |

FOREIGN PATENT DOCUMENTS

| | | |
|---|---|---|
| CN | 104520971 A | 4/2015 |
| CN | 104559628 A | 4/2015 |
| CN | 104571676 A | 4/2015 |
| CN | 105144045 A | 12/2015 |
| EP | 1138494 A2 | 10/2001 |
| JP | 2006312716 A | 11/2006 |
| JP | 2011227999 A | 11/2011 |
| JP | 2012246433 A | 12/2012 |
| JP | 2014169400 A | 9/2014 |
| JP | 2015521160 A | 7/2015 |
| KR | 20060112926 A | 11/2006 |
| KR | 20110037887 A | 4/2011 |
| KR | 20150021901 A | 3/2015 |
| KR | 20150062984 A | 6/2015 |
| WO | 2009038766 A1 | 3/2009 |
| WO | WO-2018159675 A1 * | 9/2018 ............. B41M 5/00 |

OTHER PUBLICATIONS

International Search Report from PCT/KR2016/015175, dated Apr. 3, 2017.

Written Opinion of the ISA from PCT/KR2016/015175, dated Apr. 3, 2017.

* cited by examiner

【FIG. 1】
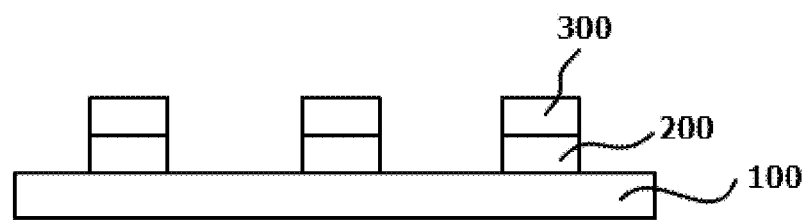
【FIG. 2】
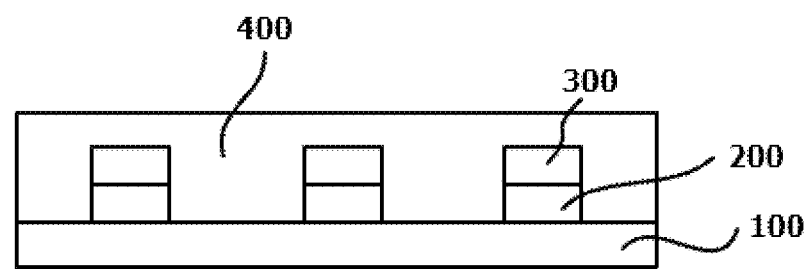
【FIG. 3】
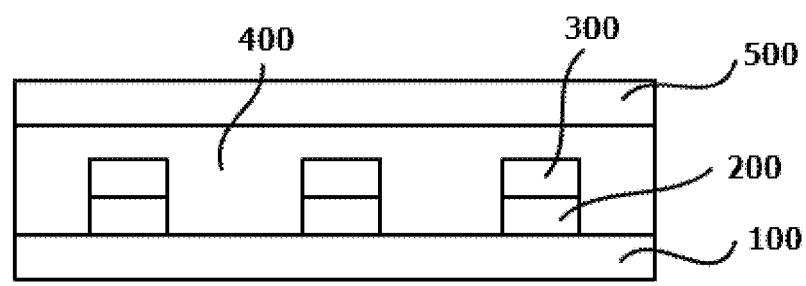

[FIG. 4]
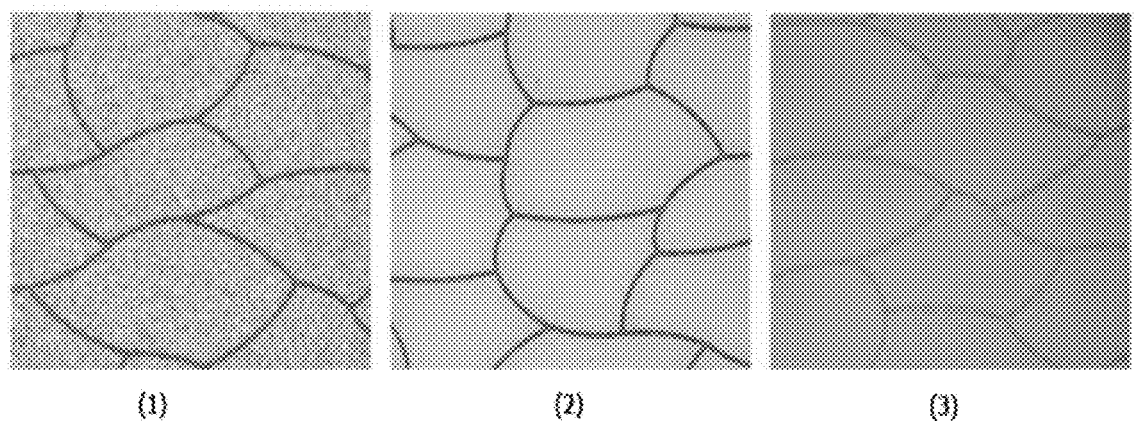
(1) (2) (3)

INK COMPOSITION, CURED PATTERNS PRODUCED THEREBY, HEATING ELEMENT INCLUDING SAME, AND MANUFACTURING METHOD THEREFOR

TECHNICAL FIELD

This application is a National Stage Application of International Application No. PCT/KR2016/015175, filed Dec. 23, 2016, and claims the benefit of Korean Patent Application No. 10-2016-0040409, filed on Apr. 1, 2016, contents of which are incorporated herein by reference in their entirety for all purposes as if fully set forth below.

The present specification relates to an ink composition, a cured pattern prepared using an ink composition, a heating element including a cured pattern, and a method for manufacturing a heating element.

BACKGROUND ART

Moisture or frost is formed on automotive glass when there is a temperature difference between outside and inside the automobile. Heating glass may be used in order to solve this problem. Heating glass uses a concept of forming a heating line by attaching a heating line sheet on the glass surface or directly forming a heating line on the glass surface, generating heat from the heating line by applying electricity to both terminals of the heating line, and increasing a temperature of the glass surface therefrom.

Particularly, methods employed for providing heating while having excellent optical performance to automotive front glass are largely divided into two types.

The first method is forming a transparent conductive thin film on the whole glass surface. The method of forming a transparent conductive thin film includes a method of using a transparent conductive oxide film such as ITO, or by forming a thin metal layer and then using transparent insulation films above and below the metal layer to increase transparency. This method has an advantage in that an optically superior conductive film may be formed, however, there is a disadvantage in that a proper heating value may not be obtained at low voltages due to a relatively high resistance value.

The second method may use a method of using a metal pattern or wire, and increasing transparency by maximizing a region having no patterns or wires. Typical products using this method include heating glass produced by inserting a tungsten wire to a PVB film used for bonding automotive front glass. In this method, the diameter of the used tungsten wire is 18 micrometers or greater, and conductivity capable of securing a sufficient heating value at low voltages may be obtained, however, there is a disadvantage in that the tungsten line is visually noticeable due to the relatively thick tungsten line. In order to overcome this problem, a metal pattern may be formed on a PET film through a printing process, or a metal pattern may be formed through a photolithography process after attaching a metal layer on a polyethylene terephthalate (PET) film. A heating product capable of heating may be produced by inserting the metal pattern-formed PET film between two polyvinyl butyral (PVB) films, and then going through a glass bonding process. However, there is a problem in that it is difficult to secure visibility of a driver while driving due to a high reflection property of the metal pattern.

DISCLOSURE

Technical Problem

The present specification is directed to providing an ink composition, a cured pattern prepared using an ink composition, a heating element including a cured pattern, and a method for manufacturing a heating element.

Technical Solution

One embodiment of the present specification provides an ink composition including an aromatic epoxy resin; a thermal acid generator; and an organic dye.

Another embodiment of the present specification provides a cured pattern having light transmittance of 30% or less at a thickness of 300 nm or less, and including a derivative in which an acid generated by a thermal acid generator and an epoxy group of an aromatic epoxy resin form bonds; and an organic dye.

Still another embodiment of the present specification provides a heating element including a substrate; a conductive heating pattern provided on the substrate; and the cured pattern provided on the conductive heating pattern.

Yet another embodiment of the present specification provides a method for forming a heating element including forming a metal film on a substrate; forming a cured pattern on the metal film using the ink composition; and forming a conductive heating pattern by etching the metal film that is not provided with the cured pattern.

Advantageous Effects

An ink composition according to the present specification can be used in a reverse offset printing method using a silicone-based blanket.

A pattern prepared using an ink composition according to the present specification has an advantage of having durability at a lamination temperature of a bonding film.

When providing a pattern prepared using an ink composition according to the present specification on a conductive heating pattern, there is an advantage of reducing visibility of the conductive heating pattern.

DESCRIPTION OF DRAWINGS

FIG. 1 is a sectional diagram of a heating element according to a first embodiment of the present specification.

FIG. 2 is a sectional diagram of a heating element according to a first embodiment of the present specification.

FIG. 3 is a sectional diagram of a heating element according to a first embodiment of the present specification.

FIG. 4 shows optical microscope images of Experimental Example 2.

REFERENCE NUMERAL

100: Substrate
200: Conductive Heating Pattern
300: Cured Pattern
400: Bonding Film or Release Film
500: Transparent Substrate

MODE FOR DISCLOSURE

Hereinafter, the present specification will be described in detail.

The present specification provides an ink composition including an aromatic epoxy resin; a thermal acid generator; and an organic dye.

The ink composition may be for preparing a darkening pattern of a heating element, and in this case, the darkening pattern prepared using the ink composition may have light transmittance of 30% or less at a thickness of 300 nm or less.

The aromatic epoxy resin controls mechanical properties of the pattern as a binder resin, and the aromatic epoxy resin is not particularly limited as long as it is an aromatic resin having an epoxy group.

The aromatic epoxy resin may have an epoxy equivalent of greater than or equal to 150 g/eq and less than or equal to 500 g/eq. Herein, the epoxy equivalent is the number of grams (g/eq) of the resin containing a 1 gram equivalent of an epoxy group, and is measured in accordance with the method defined in JIS K-7236.

The weight average molecular weight of the aromatic epoxy resin is not particularly limited, and for example, may be greater than or equal to 1,000 and less than or equal to 20,000. This secures sufficient chemical resistance for an etchant and may prevent pattern cracks and peel-offs during an etching process.

The aromatic epoxy resin may include at least one of epoxy group-substituted ortho cresol novolac, epoxy group-substituted phenol novolac, epoxy group-substituted bisphenol A novolac, epoxy group-substituted bisphenol A, epoxy group-substituted bisphenol F and epoxy group-substituted bisphenol S.

Based on the total weight of the ink composition, the content of the aromatic epoxy resin may be greater than or equal to 5 wt % and less than or equal to 15 wt %. This has an advantage of having proper viscosity for printing.

The thermal acid generator is a compound accelerating a curing reaction by generating an acid while being decomposed by heat, and, although not particularly limited thereto, the acid generating temperature of the thermal acid generator may be higher than or equal to 90° C. and lower than or equal to 120° C. When the corresponding decomposition initiation temperature is 90° C. or higher, a photosensitive resin composition having excellent storage stability may be obtained, and when the temperature is 120° C. or lower, films having excellent chemical resistance or hardness may be obtained.

The thermal acid generator is not particularly limited as long as it is capable of generating an acid at higher than or equal to 90° C. and lower than or equal to 120° C., and examples thereof may include one, two or more selected from the group consisting of 2-hydroxyhexyl paratoluenesulfonate; triarylsulfonium hexafluoroantimonate; triarylsulfonium hexafluorophosphate; tetramethylammonium trifluorometasulfonate; triethylammonium fluorosulfonate; and hexafluoroantimonate.

Based on the total weight of the ink composition, the content of the thermal acid generator may be greater than or equal to 0.01 wt % and less than or equal to 0.2 wt %. When the thermal acid generator content is in the above-mentioned range, heat resistance and chemical resistance of a printing composition are excellent. Specifically, when the thermal acid generator content is less than 0.01 wt %, the curing reaction is not sufficiently accelerated leading to a problem of decreasing heat resistance and chemical resistance. In addition, the thermal acid generator content being greater than 0.2 wt % has a problem of decreasing long-term storage stability.

The organic dye is a compound without inorganic substances, that is, a compound formed mainly with carbon and hydrogen, and may selectively further have at least one of nitrogen and oxygen.

The organic dye may include at least one of an anilino azo-based dye, a pyridone azo-based dye, a pyrazole azo-based dye, a triphenylmethane-based dye, a phthalocyanine-based dye, an anthraquinone-based dye, an anthrapyridone-based dye, an oxonol-based dye, a benzylidene dye and a xanthene dye.

The organic dye may include at least one of a black organic dye and a blue organic dye. Specifically, the organic dye may include at least one of Color Index Solvent Black 27, Color Index Solvent Black 28, Color Index Solvent Black 29, Color Index Solvent Blue 67, Color Index Solvent Blue 70 and Color Index Solvent Blue 136.

Based on the total weight of the ink composition, the content of the organic dye may be greater than or equal to 3.99 wt % and less than or equal to 10 wt %.

The ink composition may further include a solvent.

The solvent may include two or more types of solvents, and specifically, the solvent may include two or more solvents having different boiling points. More specifically, the solvent may include one or more low boiling point solvents having a boiling point of lower than 100° C. and one or more high boiling point solvents having a boiling point of 180° C. or higher. Preferably, the solvent may include a low boiling point first solvent, a low boiling point second solvent and a high boiling point solvent.

In the present specification, the low boiling point solvent may have a boiling point of lower than 100° C., specifically 95° C. or lower, and more specifically 90° C. or lower. By including a low boiling point solvent having a boiling point in the above-mentioned numerical range, a process standby time between after coating a printing composition on a blanket and before bringing a cliche into contact with the printing composition film coated on the blanket to remove a part of the film may be reduced, and a swelling phenomenon of the blanket may be reduced.

In the present specification, the low boiling point solvent may have a boiling point of 50° C. or higher. The boiling point of the first solvent being too low may cause a problem of a printing composition being dried in a nozzle when coating the printing composition on a blanket. In addition, in order to have an excellent levelling property immediately after coating the printing composition, the boiling point of the low boiling point solvent may be 50° C. or higher.

The low boiling point solvent may include one, two or more selected from the group consisting of dimethyl carbonate; methanol; methyl ethyl ketone; acetone; ethyl acetate; ethanol; isopropyl alcohol; 1,3-propyl alcohol; and n-hexane.

The high boiling point solvent is not particularly limited as long as it has a boiling point of 180° C. or higher, and may include at least one in the group consisting of gamma-valerolactone, delta-valerolactone, gamma-butylrolactone, gamma-hexalactone, gamma-octalactone, gamma-decanolactone, delta-octanolactone and delta-dodecanolactone.

Based on the total weight of the ink composition, the low boiling point first solvent content may be greater than or equal to 10 wt % and less than or equal to 80 wt %, the low boiling point second solvent content may be greater than or equal to 10 wt % and less than or equal to 80 wt %, and the high boiling point solvent content may be greater than or equal to 1 wt % and less than or equal to 15 wt %.

Based on the total weight of the ink composition, the aromatic epoxy resin content may be greater than or equal to 5 wt % and less than or equal to 15 wt %, the thermal acid generator content may be greater than or equal to 0.01 wt % and less than or equal to 0.2 wt %, the organic dye content may be greater than or equal to 3.99 wt % and less than or equal to 10 wt %, the low boiling point first solvent content may be greater than or equal to 10 wt % and less than or equal to 80 wt %, the low boiling point second solvent content may be greater than or equal to 10 wt % and less than or equal to 80 wt %, and the high boiling point solvent content may be greater than or equal to 1 wt % and less than or equal to 15 wt %.

The ink composition may further include at least one additive among a surfactant, an adhesion promotor and a curing agent.

The surfactant, the adhesion promotor and the curing agent are not particularly limited, and those generally used in the art may be employed and used.

As the surfactant, common leveling agents, wetting agents and slip agents may be used, and for example, silicone-based, fluorine-based or polyether-based surfactants may be used.

According to one embodiment of the present specification, the surfactant content may be greater than or equal to 0.01 wt % and less than or equal to 1 wt % of the total ink composition weight, or greater than or equal to 0.01 wt % and less than or equal to 0.5 wt % of the total ink composition weight. The surfactant content being in the above-mentioned range has an advantage of accomplishing uniform coating and having an excellent pattern obtaining property.

As the adhesion promotor, melamine-based, styrene-based or acryl-based oligomers or polymers may be used. The oligomer or the polymer may have a weight average molecular weight of 5,000 or less, specifically 3,000 or less, and more specifically 1,000 or less.

According to one embodiment of the present specification, the adhesion promotor content may be greater than or equal to 0.01 wt % and less than or equal to 1 wt % of the total ink composition weight, or greater than or equal to 0.01 wt % and less than or equal to 0.5 wt % of the total ink composition weight. When the adhesion promotor content is in the above-mentioned range, adhesion strength, heat resistance and chemical resistance of a pattern are excellent.

The curing agent may be a melamine-based curing agent, and may be a condensed product of a melamine derivative and formaldehyde. Specifically, the melamine-based curing agent of the present specification may include one, two or more types selected from the group consisting of Cymel300, Cymel301, Cymel303, Cymel323, Cymel325, Cymel326, Cymel327, Cymel370, Cymel373, Cymel13717 and Cymel1385 manufactured by Cytec Solvay Group, and MW-30M, MW-390, MW-100LM and MX-750LM manufactured by Sanwa Chemical Co., Ltd.

According to one embodiment of the present specification, the melamine-based curing agent content may be greater than or equal to 0.5 wt % and less than or equal to 10 wt % of the total ink composition weight. The melamine-based curing agent content being in the above-mentioned range has an advantage in that heat resistance, chemical resistance, adhesion strength with a substrate and insulating property of an offset printing composition are excellent.

The present specification provides a cured pattern having light transmittance of 30% or less at a thickness of 300 nm or less, and including a derivative in which an acid generated by a thermal acid generator and an epoxy group of an aromatic epoxy resin form bonds; and an organic dye.

The present specification provides a cured pattern prepared using the ink composition, and having light transmittance of 30% or less at a thickness of 300 nm or less.

The cured pattern may be a darkening pattern for reducing reflection of a metal micropattern.

The present specification provides a heating element including a substrate; a conductive heating pattern on the substrate; and the cured pattern provided on the conductive heating pattern.

Materials of the substrate are not particularly limited as long as it is capable of performing a role of supporting the conductive heating pattern, and for example, the substrate may be a glass substrate or a flexible substrate. Specifically, the flexible substrate may be a plastic substrate or a plastic film. The plastic substrate or the plastic film is not particularly limited, and examples thereof may include any one or more of polyaclylate, polypropylene (PP), polyethylene terephthalate (PET), polyethylene ether phthalate, polyethylene phthalate, polybuthylene phthalate, polyethylene naphthalate (PEN), polycarbonate (PC), polystyrene (PS), polyether imide, polyether sulfone, polydimethyl siloxane (PDMS), polyetheretherketone (PEEK) and polyimide (PI).

The substrate being a flexible film has an advantage in that the conductive heating pattern-provided substrate may be wound in a roll and stored so as to be used in a roll-to-roll process.

The thickness of the substrate is not particularly limited, and specifically, may be greater than or equal to 20 μm and less than or equal to 250 μm.

The line height of the conductive heating pattern may be 10 μm or less. The conductive heating pattern having a line height of greater than 10 μm has a disadvantage of increasing metal awareness by light reflection due to a side surface of the metal pattern. According to one embodiment of the present disclosure, the line height of the conductive heating pattern is in a range of greater than or equal to 0.3 μm and less than or equal to 10 μm. According to one embodiment of the present disclosure, the line height of the conductive heating pattern is in a range of greater than or equal to 0.5 μm and less than or equal to 5 μm.

In the present specification, the line height of the conductive heating pattern means a distance from a surface adjoining the substrate to a surface opposite thereto.

According to one embodiment of the present disclosure, the conductive heating pattern has a line height deviation of 20% or less and preferably 10% or less. Herein, the deviation means a percentage for a difference between an average line height and an individual line height based on the average line height.

The conductive heating pattern may be formed with thermally conductive materials. For example, the conductive heating pattern may be formed with metallic lines. Specifically, the heating pattern preferably includes metals having excellent thermal conductivity. The heating pattern material favorably has a specific resistance value of greater than or equal to 1 microOhm cm and less than or equal to 10 microOhm cm. Specific examples of the heating pattern material may include copper, silver, aluminum and the like. As the conductive heating pattern material, copper that is inexpensive and has excellent electrical conductivity is most preferred.

The conductive heating pattern may include a pattern of metallic lines formed with straight lines, curves, zigzags or combinations thereof. The conductive heating pattern may include regular patterns, irregular patterns or combinations thereof.

The total aperture ratio of the conductive heating pattern, that is, a proportion of the substrate region that is not covered by the conductive heating pattern is preferably 90% or greater.

The conductive heating pattern has a line width of 40 μm or less, and specifically 3 μm to 20 μm. The conductive heating pattern has line to line spacing of 50 μm to 1 mm.

The cured pattern may be a darkening pattern for reducing reflection of the conductive heating pattern.

The thickness of the cured pattern is not particularly limited, and for example, may be 2 μm or less, and more specifically, greater than or equal to 100 nm and less than or equal to 2 μm.

The cured pattern may be provided in a region corresponding to the conductive heating pattern, may be provided on at least a part of a side surface as well as an upper surface of the conductive heating pattern, and may be provided on the whole upper surface and side surface of the conductive heating pattern. By providing the darkening pattern on an upper surface of the conductive heating pattern, reflectivity-dependent visibility of the conductive heating pattern may be reduced.

The darkening pattern may be formed in a single layer or may be formed in a multiple layer of two or more layers.

The darkening pattern is preferably close to colors of achromatic color series. However, the darkening pattern is not necessarily an achromatic color, and may be introduced when having low reflectivity even when having colors. Herein, the color of achromatic color series means a color appearing when light entering on a surface of an object is evenly reflected and absorbed for wavelengths of each component without being selectively absorbed. In the present specification, as the darkening pattern, materials having a total reflection standard deviation for each wavelength range of 50% or less when measuring total reflection in a visible region (400 nm to 800 nm) may be used.

The darkening pattern preferably has a pattern form having the same or a larger line width than the line width of the conductive heating pattern.

When the darkening pattern has a pattern form having a larger line width than the line width of the conductive heating pattern, an effect of the darkening pattern shielding the conductive heating pattern may be more greatly provided when users see, which leads to an advantage of efficiently blocking an effect obtained by gloss or reflection of the conductive pattern itself. However, target effects of the present specification may be accomplished even when the darkening pattern has the same line width as the conductive pattern.

The heating element may further include bus bars provided on both ends of the conductive heating pattern. In addition, the heating element may further include a power supply unit connected to the bus bar.

According to another embodiment of the present disclosure, a black pattern may be provided in order to conceal the bus bar. For example, the black pattern may be printed using a paste containing a cobalt oxide. Herein, screen printing is suited as the printing method, and the thickness may be set at 10 μm to 100 μm. The conductive heating pattern and the bus bar may each be formed either before or after forming the black pattern.

The heating element may further include a transparent substrate provided at least one of on the cured pattern and on a surface opposite to the surface of the substrate provided with the cured pattern.

The transparent substrate means a transparent substrate of an end product to use a heating element, and for example, the transparent substrate may be a glass substrate and preferably may be automotive glass.

When the transparent substrate is provided on the cured pattern, a bonding film provided between the transparent substrate and the cured pattern may be further included.

When the transparent substrate is provided on a surface opposite to the surface of the substrate provided with the cured pattern, a bonding film provided between the transparent substrate and the surface opposite to the surface of the substrate provided with the cured pattern may be further included.

The bonding film means having a bonding property at a process temperature or higher used in a thermal bonding process. For example, the bonding film means those capable of exhibiting a bonding property with a transparent substrate in a thermal bonding process used for manufacturing a heating element in the art. Pressures, temperatures and times of the thermal bonding process vary depending on the types of the bonding film, however, the thermal bonding process may be carried out at a temperature selected in a range of 130° C. to 150° C., and a pressure may be applied as necessary. As materials of the bonding film, polyvinyl butyral (PVB), ethylene vinyl acetate (EVA), polyurethane (PU), polyolefin (PO) and the like may be used, however, the material is not limited to these examples.

The bonding film has a thickness of greater than or equal to 190 μm and less than or equal to 2,000 μm. When the bonding film has a thickness of 190 μm or greater, the bonding film yields sufficient bonding strength with the transparent substrate later while stably supporting the conductive heating pattern. Sufficient supporting property and bonding property are obtained when the bonding film has a thickness of 2,000 μm or less, and an unnecessary thickness increase may be prevented.

According to one embodiment of the present disclosure, the bonding film has a glass transition temperature (Tg) of higher than or equal to 55° C. and lower than or equal to 90° C. Even when the bonding film has such a low glass transition temperature (Tg), a conductive heating pattern may be formed without damages on the bonding property of the bonding film, or without unintended deformation or damages on the film in a conductive heating pattern forming process using a method described below.

The heating element according to the present disclosure may be connected to a power supply for heating, and herein, the heating value may be from 100 W to 1000 W per $m^2$ and preferably from 300 W to 700 W per $m^2$. The heating element according to the present disclosure has excellent heating performance even at low voltages, for example, 30 V or less and preferably 15 V or less, and therefore, is useful in automobiles and the like. Resistance in the heating element is 2 ohm/square or less, preferably 1 ohm/square or less and more preferably 0.5 ohm/square or less. The resistance value obtained herein has the same meaning as sheet resistance.

According to another embodiment of the present disclosure, the heating element may be a heating element for automotive glass.

According to another embodiment of the present disclosure, the heating element may be a heating element for automotive front glass.

The present specification provides a method for manufacturing a heating element including forming a metal film on a substrate; forming a cured pattern on the metal film using the ink composition; and forming a conductive heating pattern by etching the metal film that is not provided with the cured pattern.

The metal film may be formed using methods of deposition, plating, metal foil lamination and the like, and by the cured pattern formed on the metal film performing a role of an etching protective pattern, a conductive heating pattern may be formed by etching the metal film that is not covered by the cured pattern.

The method for heating a heating element includes forming a cured pattern on the metal film using the ink composition. As for descriptions on the ink composition, the descriptions on the ink composition provided above may be used.

When forming a cured pattern using the ink composition of the present specification, the method of forming a cured pattern is not particularly limited, and a roll printing method may be used. Specifically, the method of forming a cured pattern may be a reverse offset printing method using a silicone-based blanket.

Hardness of the silicone-based blanket used in the reverse offset printing method may be Shore A hardness 20 to 70. According to one embodiment of the present specification, the silicone-based blanket means a blanket having a perimeter being formed with a silicone-based material. The silicone-based material is not particularly limited as long as it includes a curable group while including silicone, but may have hardness of 20 to 70, and specifically may have hardness of 30 to 60. The hardness means Shore A hardness. By using a silicone-based material in the above-mentioned hardness range, the blanket deformation may occur in a proper range. When the hardness of the blanket material is too low, a part of the blanket touches an engraved portion of a cliche due to blanket deformation during an off process removing a part of the printing composition film from the blanket using the cliche, and the degree of pattern precision may decrease. In addition, materials having hardness of 70 or less may be selected considering selection readiness of the blanket material.

For example, as the silicone-based blanket material, polydimethyl siloxane (PDMS)-based curable materials may be used. The blanket material may further include additives known in the art in the range that does not harm the purposes of the present disclosure.

The forming of a cured pattern may include heat treating and curing the ink pattern formed using the ink composition. In the heat treatment, a thermal acid generator generates an acid by heat, and epoxy of an aromatic epoxy resin opens by the generated acid to form crosslinking.

The heat treatment temperature in the heat treatment is a temperature at which the thermal acid generator is capable of generating an acid, and when the ink pattern includes a thermal acid generator having an acid generating temperature of higher than or equal to 90° C. and lower than or equal to 120° C., the heat treatment temperature may be higher than or equal to 90° C. and lower than or equal to 130° C.

The heat treatment time of the heat treatment is not particularly limited, and the time may be longer than or equal to 1 minute and shorter than or equal to 30 minutes.

The forming of a conductive heating pattern is providing the cured pattern on the metal film as an etching protective pattern, and may be forming a conductive heating pattern by etching the metal pattern that is not covered by the cured pattern.

The manufacture of a heating element may further include, after the forming of a conductive heating pattern, simultaneously or consecutively laminating a transparent substrate at least one of on the cured pattern and on a surface opposite to the surface of the substrate provided with the cured pattern.

When the transparent substrate is provided on the cured pattern, a forming of a bonding film on the cured pattern may be further included, or the bonding film-provided transparent substrate may be laminated so that the cured pattern and the bonding film are in contact with each other.

When the transparent substrate is provided on a surface opposite to the surface of the substrate provided with the cured pattern, a forming of a bonding film on a surface opposite to the surface of the substrate provided with the cured pattern may be further included, or the bonding film-provided transparent substrate may be laminated so that the substrate and the bonding film are in contact with each other.

Hereinafter, the present specification will be described in more detail with reference to examples. However, the following examples are for illustrative purposes only, and not to limit the present specification.

EXAMPLE

An ink composition was prepared in the composition as in the following Table 1. Using the ink composition, a darkening pattern was formed on a metal film using a reverse offset printing process. The darkening pattern-formed metal film was heat treated for 10 minutes at 130° C., and the metal in a region that is not provided with the pattern was removed through an etching process to prepare a final conductive heating pattern provided with the darkening pattern. Polyvinyl butyral (PVB) films were provided on the conductive heating pattern-formed substrate upper surface and a surface opposite thereto. This was placed between two sheets of glass, and the result was laminated for 10 minutes at 120° C. using vacuum lamination.

TABLE 1

| | | Example 1 | Example 2 | Example 3 | Example 4 | Comparative Example 1 | Comparative Example 2 | Comparative Example 3 |
|---|---|---|---|---|---|---|---|---|
| Binder | Type | A | B | B | B | C | B | B |
| | Content | 7 wt % | 7 wt % | 5 wt % | 7 wt % | 7 wt % | 7 wt % | 7 wt % |
| | Epoxy Equivalent (g/eq) | 200 to 230 | 190 to 220 | 190 to 220 | 300 to 320 | 0 | 190 to 220 | 190 to 220 |
| Organic Dye | | 4 wt % | 4 wt % | 6 wt % | 4 wt % | 4 wt % | 4 wt % | 4 wt % |
| Thermal Acid Generator | | 0.15 wt % | 0.15 wt % | 0.15 wt % | 0.15 wt % | 0.15 wt % | 0.15 wt % | — |
| Solvent | 1) | | 48 wt % | 48 wt % | 48 wt % | 48 wt % | 48 wt % | 48 wt % |
| | 2) | | 28 wt % | 28 wt % | 28 wt % | 28 wt % | 28 wt % | 28 wt % |
| | 3) | | 10 wt % | 10 wt % | 10 wt % | 10 wt % | 10 wt % | 10 wt % |

TABLE 1-continued

|  | Example 1 | Example 2 | Example 3 | Example 4 | Comparative Example 1 | Comparative Example 2 | Comparative Example 3 |
|---|---|---|---|---|---|---|---|
| Surfactant | 0.5 wt % | 0.5 wt % | 0.5 wt % | 0.5 wt % | 0.5 wt % | 0.5 wt % | 0.5 wt % |
| Adhesion Promotor | 0.85 wt % | 0.85 wt % | 0.85 wt % | 0.85 wt % | 0.85 wt % | 0.85 wt % | 0.85 wt % |
| Curing Agent | 1.5 wt % | 1.5 wt % | 1.5 wt % | 1.5 wt % | 1.5 wt % | 1.5 wt % | 1.5 wt % |

* A: bisphenol A-type novolac epoxy resin
* B: ortho cresol novolac epoxy resin
* C: cresol novolac resin
* 1): acetone,
2): methyl ethyl ketone,
3): gamma-butyrolactone Experimental Example 1

As for compatibility of the ink composition, the ink composition was prepared and passed through a filter with a 1 μm pore size, and availability when filtering was determined. Herein, when available after filtering, it was determined as o, and when not available after filtering, it was determined as x.

As for a printing property of the ink composition, a pattern was formed as in the following method, and it was determined as A when the pattern was obtainable in a 100% range of the whole printing area, it was determined as B when the pattern was obtainable in a 80% range, it was determined as C when the pattern was obtainable in a 50% range, and it was determined as x when the pattern was not obtainable in the whole printing area.

The pattern was formed as follows. The ink composition was coated on a silicone blanket at a rate of 80 mm/sec to form a film having a thickness of 15 μm before drying, and this was transferred to a cliche having an engraved heating pattern to form a pattern corresponding to the cliche on the blanket. The printing composition pattern formed on the blanket was transferred on a metal film to form a pattern, and an area where the pattern was obtained was measured with respect to the whole printing area.

In addition, the line width of the pattern formed using the above-mentioned pattern forming method was measured with a microscope using a cliche having an engraved heating pattern with a 15 μm line width, and the results are shown in FIG. 2.

Etching resistance of the pattern formed using the above-mentioned pattern forming method was determined by observing a degree of maintaining the ink film after etching and a degree of obtaining the metal pattern using an etching process through a sulfuric acid-hydrogen peroxide etchant. The etchant temperature was 25±1° C. during the etching process, and the etching was progressed additionally for 1.5 times longer based on the time at which all the metals in a region with no pattern formation were etched and removed after metal film immersion. Herein, it was determined as A when the ink film was maintained and the metal pattern was formed in a 100% range of the whole printing area, it was determined as B when the ink film was maintained and the metal pattern was formed in a 80% range of the whole printing area, it was determined as C when the ink film was maintained and the metal pattern was formed in a 50% range of the whole printing area, it was determined as x when the ink film was lost and the metal pattern was not formed in the whole printing area.

As for durability of the pattern formed through the printing and the etching methods, pattern maintaining properties were determined after laminating PVB on the pattern for 20 minutes to 180 minutes under a condition of higher than or equal to 100° C. and lower than or equal to 160° C., and herein, it was determined as o when the pattern was maintained, and x when the pattern was not maintained.

After spin coating the ink composition on a 10×10 sized glass substrate, the result was dried for 180 seconds at 110° C. on a hot plate to form an ink film having a thickness of 300 nm. For the formed ink film, transmittance was evaluated in a 300 nm to 780 nm wavelength using a transmittance analyzer (UV/Vis spectrometer Solidspec3700, Shimadzu Corp.). The results are shown in the following Table 2.

Experimental results for each of Examples 1 to 4 and Comparative Examples 1 to 3 are shown in the following Table 2, and in Comparative Example 2, printing properties and etching properties were not able to be identified due to poor compatibility.

TABLE 2

|  | Example 1 | Example 2 | Example 3 | Example 4 | Comparative Example 1 | Comparative Example 2 | Comparative Example 3 |
|---|---|---|---|---|---|---|---|
| Compatibility | o | o | o | o | o | x | o |
| Printing Property | A | A | A | A | A | — | A |
| Line Width (μm) | 16.0 to 16.3 | 16.0 to 16.3 | 16.0 to 16.3 | 15.9 to 16.1 | 16.0 to 16.3 | — | 16.0 to 16.3 |
| Etching Resistance | A | A | A | B | A | — | C |
| Durability | o | o | o | o | x | — | x |
| Light Transmittance | <20% | <20% | <15% | <20% | <20% | — | <20% |

Experimental Example 2

Optical Microscope Measurement

Using the ink composition of Example 1, (1) the pattern formed on the metal film, (2) after etching the metal film, and (3) after laminating PVB on the pattern were measured using an optical microscope, and the results are shown in FIG. 4.

The invention claimed is:

1. An ink composition comprising:
   an aromatic epoxy resin;
   a thermal acid generator;
   an organic dye; and
   a solvent,
   wherein the solvent includes two or more solvents having different boiling points, and
   wherein the ink composition is for preparing a darkening pattern of a heating element.

2. The ink composition of claim 1, wherein the aromatic epoxy resin has an epoxy equivalent of 150 g/eq or more and 500 g/eq or less.

3. The ink composition of claim 1, wherein the aromatic epoxy resin includes at least one of epoxy group-substituted ortho cresol novolac, epoxy group-substituted phenol novolac, epoxy group-substituted bisphenol A novolac, epoxy group-substituted bisphenol A, epoxy group-substituted bisphenol F and epoxy group-substituted bisphenol S.

4. The ink composition of claim 1, wherein the thermal acid generator has an acid generating temperature of 90° C. or more and 120° C. or less.

5. The ink composition of claim 1, wherein the organic dye includes at least one of an anilino azo-based dye, a pyridone azo-based dye, a pyrazole azo-based dye, a triphenylmethane-based dye, a phthalocyanine-based dye, an anthraquinone-based dye, an anthrapyridone-based dye, an oxonol-based dye, a benzylidene dye and a xanthene dye.

6. The ink composition of claim 1, wherein the organic dye includes at least one of Color Index Solvent Black 27, Color Index Solvent Black 28, Color Index Solvent Black 29, Color Index Solvent Blue 67, Color Index Solvent Blue 70 and Color Index Solvent Blue 136.

7. The ink composition of claim 1, further comprising at least one of:
   a surfactant;
   an adhesion promotor; and
   a curing agent.

8. The ink composition of Claim 1, wherein the two or more solvents include one or more low boiling point solvents and one or more high boiling point solvents.

9. The ink composition of claim 8, wherein, based on a total weight of the ink composition, a content of the aromatic epoxy resin is 5 wt % or more and 15 wt % or less, a content of the thermal acid generator is 0.01 wt % or more and 0.2 wt % or less, a content of the organic dye is 3.99 wt % or more and 10 wt % or less, a content of the low boiling point first solvent is 10 wt % or more and 80 wt % or less, a content of the low boiling point second solvent is 10 wt % or more and 80 wt % or less, and a content of the high boiling point solvent is 1 wt % or more and 15 wt % or less.

10. A cured pattern having light transmittance of 30% or less at a thickness of 300 nm or less, the cured pattern comprising:
    a derivative in which an acid generated by a thermal acid generator and an epoxy group of an aromatic epoxy resin form bonds; and
    an organic dye,
    wherein the cured pattern is a cured product of the ink composition of claim 1.

11. A heating element comprising:
    a substrate;
    a conductive heating pattern provided on the substrate; and
    the cured pattern of claim 10 provided on the conductive heating pattern.

12. The heating element of claim 11, wherein the cured pattern is a darkening pattern.

13. A method for manufacturing a heating element comprising:
    forming a metal film on a substrate;
    forming a cured pattern on the metal film using the ink composition of claim 1; and
    forming a conductive heating pattern by etching the metal film that is not provided with the cured pattern.

14. The method for manufacturing a heating element of claim 13, wherein the forming of a cured pattern is a reverse offset printing method.

15. The method for manufacturing a heating element of claim 13, wherein the forming of a cured pattern includes heat treating and curing an ink pattern formed using the ink composition.

16. The method for manufacturing a heating element of claim 13, further comprising, after the forming of a conductive heating pattern, laminating a transparent substrate at least one of on the cured pattern and on a surface opposite to the surface of the substrate provided with the cured pattern.

* * * * *